Patented June 14, 1949

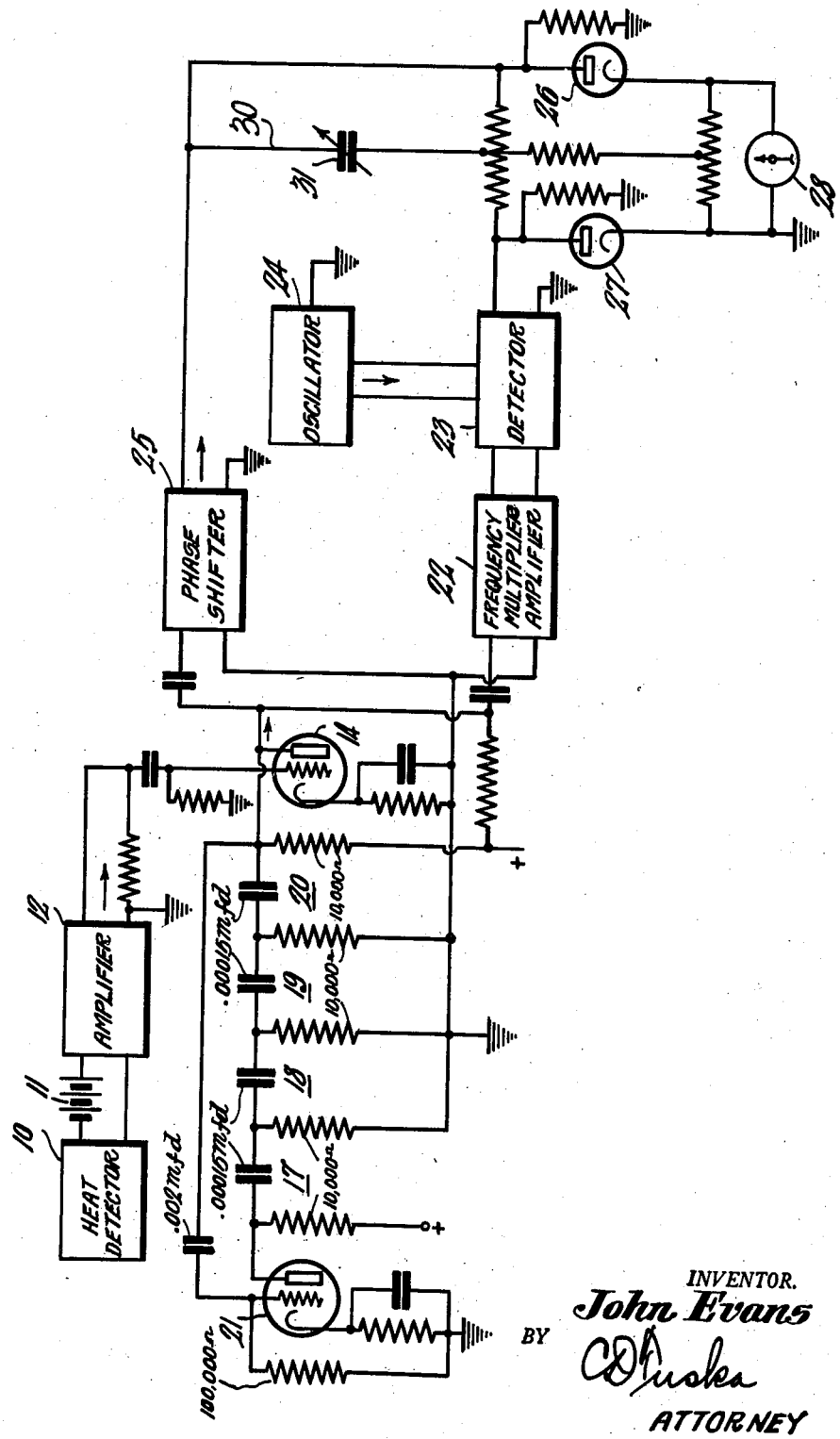

2,473,197

UNITED STATES PATENT OFFICE 2,473,197

HEAT DETECTING SYSTEM

John Evans, Hightstown, N. J., assignor to Radio Corporation of America, a corporation of Delaware Application June 21, 1945, Serial No. 600,713

2 Claims. (Cl. 250—83.3)

The present invention relates to infra red detecting systems and more particularly to a novel system of amplifying detected heat waves emanating from a source of heat.

An object of the invention is to provide an improved system for detecting infra red heat waves.

Another object of the invention is to provide a system which is extremely sensitive in the detection of heat waves.

Another object of the invention is to provide a novel amplifier in association with a heat detector for assuring indication of the response of the heat detector to minute heat waves.

A further object is to convert detected heat into an electric current and utilizing the current to vary the phase or frequency of an oscillator in such a manner as to produce a resultant current as a measure of the detected heat.

Other objects will hereinafter appear.

In the accompanying drawings, the figure represents diagrammatically a system embodying one form of the present invention.

Referring to the drawings, a heat detector unit 10 of well known form is arranged to respond to received heat waves from a source to which the detector may pick up, as, for example, in sweeping the horizon. The response of the detector to received heat is converted into an electric current through the medium of a battery 11 or other source of voltage. The output from the detector unit 10 is preliminarily amplified by amplifier 12 and then impressed upon the grid of a modulating amplifier tube 14, which tube 14 is arranged as the output section of a resistance-capacitance oscillation network, the terminals of which are respectively connected to the anode and cathode of the tube 14. This network comprises four resistance-capacitance sections 17, 18, 19 and 20, connected to the circuit of an oscillator tube 21, which utilizes the feed back obtained by the aforesaid resistance network, and each section thus produces a phase shift of forty-five electrical degrees, i. e. at the chosen operating frequency. In the preferred network, the several resistances are each of 10,000 ohms, the several condensers of a capacity of .00015 mfd., and the condenser in the feed-back circuit of .002 mfd. capacity.

In the network, here shown by way of example, the supplied frequency of the oscillator 21 produces a frequency of 6000 cycles at the tube 14 for modulation by the amplified heat detector current. Since the output of the phase shift network utilizes the plate resistance of the tube 14, the varying grid voltage of tube 14, due to the impressed voltage causes the effective resistance of the tube 14 to vary and, as any modification of the network output resistance will change the phase shift nearly proportional to the grid voltage, a new instantaneous frequency or a phase shift obtains for each increment of grid voltage on tube 14. This new frequency or phase is multiplied by an amplifier 22 giving, in the present example, a frequency of 600,000 cycles, which is supplied to a detector 23 simultaneously with the output of a beating oscillator 24 oscillating at 594,000 cycles or 606,000 cycles in order to produce a difference frequency at the output of the detector 23 which is the same as the originating oscillator undeviated frequency of oscillator 21.

While this resultant frequency in the output of the detector 23 will be substantially the same as the frequency of oscillator 21, it will contain a phase modulation for any modulation introduced at the grid of the tube 14. The rate of change of the phase angle will be determined by the rate of change of the heat signal voltage introduced at the grid of tube 14 and the phase deviation at the output of the detector 23 will be determined by the amplitude of the voltage on the aforesaid grid.

In order to obtain an accurate indication of the received heat signal, the output of the originating frequency (that is from oscillator 21 and resistance network), is fed to a phase shift network 25 which is set to delay by 180° the frequency delivered thereto. The output of the phase shift network 25 is fed to the anode of a diode 26, while the output of the detector 23 is fed to the anode of a second diode 27. The respective cathodes of the two diodes 26 and 27 are connected to an indicating meter 28. The aforesaid two anodes are arranged electrically 180° apart in time phase through the medium of a branch connection 30 feeding both anodes in parallel by way of condenser 31, the reactance of which is set so as to produce a phase delay of 90°. Therefore, if an undeviated condition is assumed for the originating frequency, the quadrature phase relations existing at the diodes 26 and 27 will cause the indicating meter 28 to read zero. Obviously, any departure from the original quadrature condition will cause a deflection of the indicating meter as a function of the heat signal received and thus serve as a measure thereof.

I claim as my invention:

1. An amplifier system for an electronic heat detector, comprising in combination, a resistance-capacitance oscillator having an output section including the anode-cathode resistance of a gridcontrolled electronic-tube amplifier as the shunt resistance element thereof, a source of variable grid potential for said tube responsive to received heat wave variations to vary the oscillator output frequency, a pair of diode rectifiers coupled in parallel through separate signal paths with said output circuit, a 180° phase-shift network in one of said paths, a frequency multiplier and a detector connected serially in the other of said paths, a beating oscillator coupled to said detector to provide a beat frequency output substantially at the first oscillator frequency, and a common balanced output circuit for said diode rectifiers providing a differential output current in response to frequency variation of said first oscillator.

2. An amplifier system as defined in claim 1, wherein current responsive indicating means is connected with the diode rectifier output circuit, and phase control capacitor means is provided in connection with the diode rectifiers to balance the system at the normal operating frequency of the first oscillator.

JOHN EVANS.

REFERENCES CITED

The following references are of record in the file of this patent:

UNITED STATES PATENTS

| Number | Name | Date |
|---|---|---|
| 1,379,166 | Case | May 24, 1921 |
| 1,954,204 | Hayes | Apr. 10, 1934 |
| 2,383,005 | Marks | Aug. 21, 1945 |
| 2,393,717 | Speaker | Jan. 29, 1946 |

OTHER REFERENCES

Terman, Radio Engineers Handbook, McGraw-Hill, 1943 edition, pp. 582–588.